United States Patent [19]

Nakano et al.

[11] Patent Number: 5,136,227
[45] Date of Patent: Aug. 4, 1992

[54] ACTIVE GRAVITY COMPENSATION DEVICE FOR FORCE CONTROL SYSTEM

[75] Inventors: Eiji Nakano; Tatsuo Arai, both of Ibaraki, Japan

[73] Assignee: Agency of Industrial Science & Technology, Ministry of International Trade & Industry, Tokyo, Japan

[21] Appl. No.: 237,611

[22] Filed: Aug. 29, 1988

Related U.S. Application Data

[63] Continuation of Ser. No. 905,498, Sep. 10, 1986, abandoned.

[30] Foreign Application Priority Data

Sep. 10, 1985 [JP] Japan .................................. 60-199870

[51] Int. Cl.[5] .......................................... G05D 23/275
[52] U.S. Cl. ................................. 318/689; 318/632; 318/51

[58] Field of Search .................. 318/49, 51, 568.11, 318/632, 689, 568.16, 568.19, 568.2, 568.21, 568.22

[56] References Cited

U.S. PATENT DOCUMENTS

| | | | |
|---|---|---|---|
| 4,362,978 | 12/1982 | Pollard | 318/632 X |
| 4,425,818 | 1/1984 | Asada | 310/112 X |
| 4,591,772 | 5/1986 | Hollow | 318/632 |
| 4,603,284 | 7/1986 | Perzley | 318/632 X |

Primary Examiner—William M. Shoop, Jr.
Assistant Examiner—A. Jonathan Wysocki
Attorney, Agent, or Firm—Oblon, Spivak, McClelland, Maier & Neustadt

[57] ABSTRACT

An active gravitation compensation device, in which the weight of a driven member is supported substantially in a gravitation-free state by the output of a servo-actuator, and a small-sized torque motor is directly coupled to the driven member to control the operation of the driven member with the output of the torque motor.

3 Claims, 5 Drawing Sheets

ACTIVE GRAVITY COMPENSATION DEVICE FOR FORCE CONTROL SYSTEM

This application is a continuation of application Ser. No. 905,498, filed on Sep. 10, 1986, now abandoned.

FIELD OF THE INVENTION AND RELATED ART STATEMENT

This invention relates to an active gravity compensation device for a force control system and, more particularly, to a force control system for compensating for gravitation acting on a robot manipulator.

An arm mechanism of an ordinary industrial robot consists basically of a position control system. In cases where force control is effected by the use of the position control system, it is necessary to incorporate a force sensor into the position control system at a suitable position. Force control is effected in the position control system having a force sensor by effecting position control in accordance with an amount fed back from the force sensor and utilizing either compliance exerted onto a mechanism section or elastic deformation of an object being controlled. Therefore, it is very cumbersome and difficult to carry out an operation requiring such force control, cranking operation or tracing operation.

For the purpose of torque control it seems effective to employ an actuator capable of ready torque control, e.g. a torque motor, in the position control system. However, speed reduction gear means having a large speed reduction ratio cannot be used for the torque control. For this reason, it is recommended to use a torque motor without the use of any speed reducer. However, even where a high output torque motor capable of providing a higher output compared with an ordinary servomotor is used, only a low output can be obtained with a direct-coupling mechanism so that it is possible to support only the weight, for instance, of a manipulator. Perfect torque control may be realized with a single high capacity torque motor or with parallel connected torque motors. In this case, however, the motor section is gigantic and expensive. This is particularly undesirable because of the demand for a light weight actuator for a robot manipulator, where the actuator is coupled in the form of a cantilever.

OBJECT AND SUMMARY OF THE INVENTION

An object of the invention is to provide an active gravity compensation device, a device which can actively compensate for the gravity exerted on, for instance, a manipulator, which can effect force control independently, accurately and economically.

To attain the above object, according to the invention the weight of a driven member is supported using a comparatively inexpensive, ordinary servomotor or the like so that the driven member appears to be in a gravitation-free state or in a weight equilibrium state, and only the level of operating output necessary for force control is given to the driven member by using a direct drive torque motor which has excellent precision and is very responsive. Thus, accurate force control for the driven member can be obtained with a small-sized direct drive motor, and it is possible to provide the control device inexpensively and improve the control liability.

The above and other objects and features of the invention will become more apparent from the following detailed description of the invention with reference to the accompanying drawings.

DETAILED DESCRIPTION OF THE PREFERRED EMBODIMENT

Figure 1:
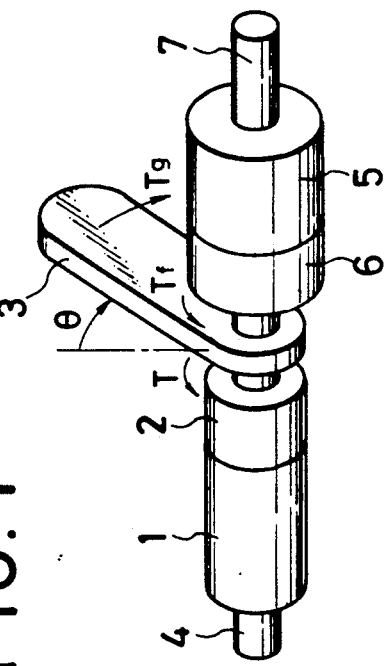
FIG. 1 is a view showing the basic structure of the active gravitation compensation device according to the invention.

FIG. 1 shows the basic structure of the active gravity compensation device according to the invention. Reference numeral 1 designates a servo-actuator, e.g. a servomotor with a speed reducer, numeral 2 a torque sensor for the servo-actuator, numeral 3 an arm as a driven member whose gravity is actively compensated for by the servo-actuator 1, numeral 4 a tacho-generator, numeral 5 a direct drive torque motor, numeral 6 a torque sensor for the torque motor, and numeral 7 a resolver for detecting the angle of the arm 3.

The arm 3 functions as a robot manipulator or the like. As the servo-actuator 1 for active gravity compensation, a usual DC servomotor or a combination of such a DC servomotor and a speed reducer is used with speed reduction to a value in the range of from 1/10 to 1/50. Also, it is possible to use a servo-actuator which makes use of pneumatics, hydraulics, etc. The reasons for using the servomotor with speed reduction to a value in the range of from 1/10 to 1/50 as a servo-actuator to actively support the weight of the arm are the following: with speed reduction the output can be increased; it is possible to use a servomotor of a reduced size; it is possible to suppress backlash because the speed reducer has a couple of stages; and a servomotor with a speed reducer is available inexpensively.

The direct drive torque motor 5 is used for the purpose of generating torque which is required to drive the arm with the weight thereof supported by the servo-actuator 1. Since the weight of the arm is supported so that the arm is in or nearly in a gravitation-free state, it is necessary to generate only the level of force necessary for the operation of the arm. Thus, it is possible to use a small-sized torque motor to obtain precise output torque control. The torque motor may be used with a speed reducer with such a low speed reduction ratio that no backlash is produced.

The servo-actuator 1 is connected through the torque sensor 2 to one of the shafts extending from the opposite sides of a stem of the arm 3, and it provides sufficient torque for supporting only the weight of the arm 3. Its output is detected by the torque sensor 2 and the gravity of the arm 3 is compensated for by a method which will be described later in detail. The tacho-generator 4 is provided for detecting the revolving velocity of the servo-actuator 1. It is employed with the aim of obtaining satisfactory controllability. The shaft of the torque motor 5 is coupled through the torque sensor 6 to the other shaft extending from the opposite sides of the stem of the arm 3. Thus, the torque necessary only for the operation of the arm 3 is produced by the torque motor. The displacement (i.e., rotational angle) of the arm 3 is detected by the resolver 7.

The principles underlying the control system for active compensation of the weight of the arm for gravitation as shown in FIG. 1 will now be explained. In this control system, the motion of the arm shown in FIG. 1 is expressed as $$J\ddot{\theta} = T - T_g + T_f \quad (1)$$

where
J : moment of inertia of the arm
$T_g$: torque due to weight of the arm
T : active gravitation compensation torque
$T_f$: externally applied torque consisting mainly of torque motor output
$\ddot{\theta}$ : quadratic differential of i.e. $\frac{\partial^2 \theta}{\partial t^2}$ When the arm 3 is brought to a position of angle $\theta$ (FIG. 1), the gravitational force to be compensated for, i.e. reference torque $^rT_g$, is given as $$^rT_g = mg \cdot l \cdot \sin \theta \quad (2)$$

where l is the length of the arm up to the center of gravity, and m is the mass of the arm.

The principle of active compensation of the weight of the arm 3 at a given angle $\theta$ will be explained with reference to FIG. 2(a). The reference torque $^rT_g$ corresponding to the angle $\theta$ of the arm 3 is calculated by a torque computing device 11 on the basis of the equation (2), and a corresponding voltage is provided. This output signal $^rT_g$ is compared with the output T of the torque sensor 2, and it is fed through a proportional-plus-integral-plus-derivative controller (PID controller) 12 to a motor driving circuit 13 to drive the servo-actuator 1 with the torque T. The output torque T is very close to the reference torque $^rT_g$ and also very close to the torque $T_g$ due to the weight of the arm. Thus, the torque $T_g$ due to the weight of the arm is substantially perfectly compensated for at the angle $\theta$ by the active gravitation compensation control system shown in FIG. 2(a). When the angle $\theta$ of the arm varies, the weight thereof is compensated for with respect to the varied angle $\theta$ in the same manner. The arm is thus held as if it were floating in a gravitation-free space at any angle.

When the output $T_f$ of the torque motor 5 is applied to the arm 3 in the gravitation-free state, the arm is moved by the force of the output $T_f$ so that the angle $\theta$ of the arm is changed. This motion of the arm is expressed by the equation (1). In the equation (1), $T \approx T_g$. The right half of the control system shown in FIG. 2(a) does not show the arm weight compensation control, it shows the behavior of the arm as will be obtained from the equation of the arm motion and also shows the presence of the signal. Further, 1/s in the block diagram shows that the angle $\theta$ can be obtained by integrating $\dot{\theta}$. Actually, the resolver 7 progressively detects the varying angles $\theta$ of the arm, and the detected values are differentiated to obtain $\dot{\theta}$.

The torque motor excels in output control. However, a large-sized torque motor is expensive. It is too large and too heavy to employ as a robot arm or like complicated mechanism. According to the invention, the torque motor is used only for force control, so that it may be small in size so as to obtain accurate control of the force applied to the driven member, i.e. the arm 3.

In the above explanation, the arm has a prescribed weight which is recorded in the torque computing device. The weight compensation will be considered in a case where an unknown weight is added to the weight of the arm, such as when the arm grips something. The torque computing device 11 provides a voltage signal as reference torque $^rT_f$ such that the weight of the arm can be supported, thus driving the servomotor to drive the arm. When the arm becomes stationary, the angle of the arm is detected. The load (mass) of the arm, angle $\theta$ thereof, and reference torque $^rT_g$ have a mutual relationship as will be understood from the equation (2), so that the arm load can be obtained from the angle $\theta$ and reference torque $^rT_g$ in the stationary state. Thus, the weight of the arm at a desired position can be compensated for by obtaining the reference torque at a desired angle of the arm from the reference torque in the stationary state of the arm and correcting the output signal of the torque computing device 11 to the reference torque at the desired angle.

Now, a method of so-called arm position control, in which the arm in an active gravitation compensated state is moved to a certain desired position or becomes stationary at a certain position, and a method of so-called force control, in which the arm is controlled with given force, will be described with reference to FIGS. 2(b) and 2(c).

Figure 2A:
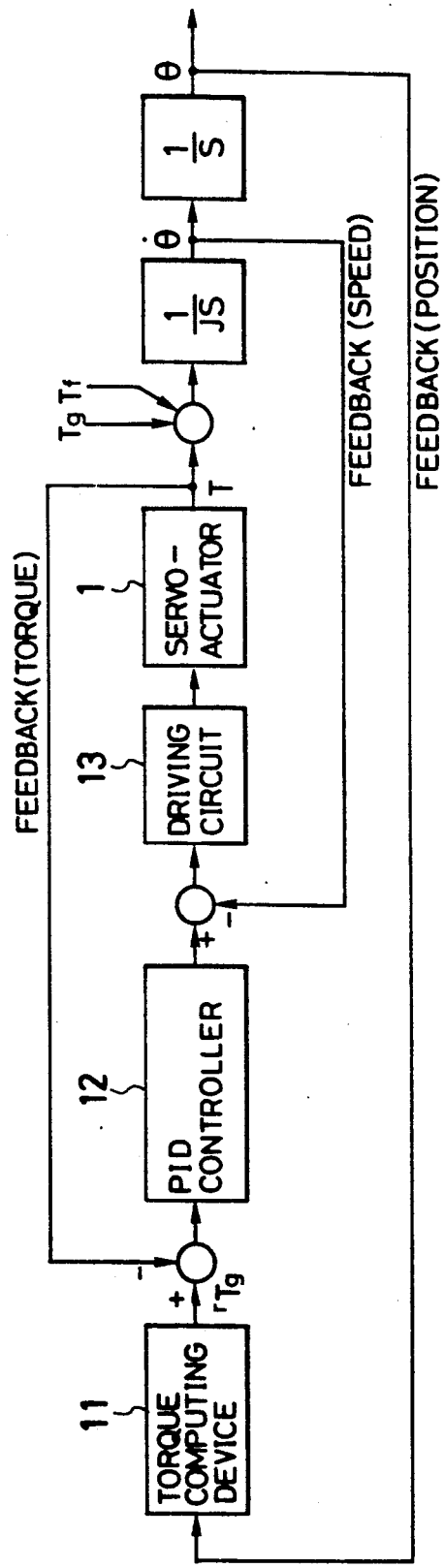
FIGS. 2(a) to 2(c) are block diagrams showing control systems employing the active gravitation compensation device according to the invention.
Figure 2B:
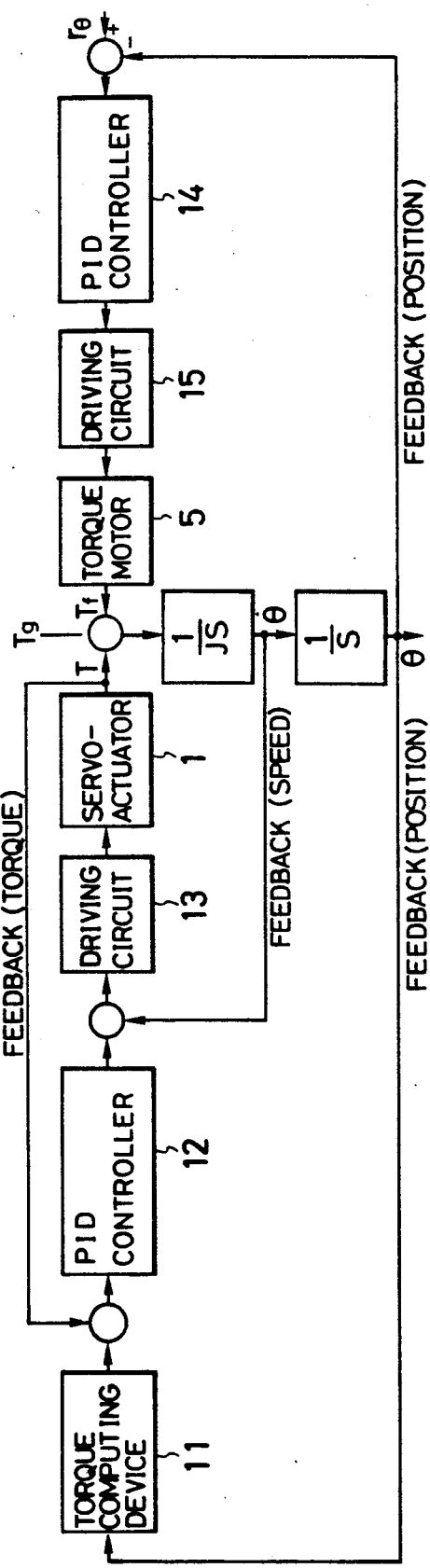
Figure 2C:
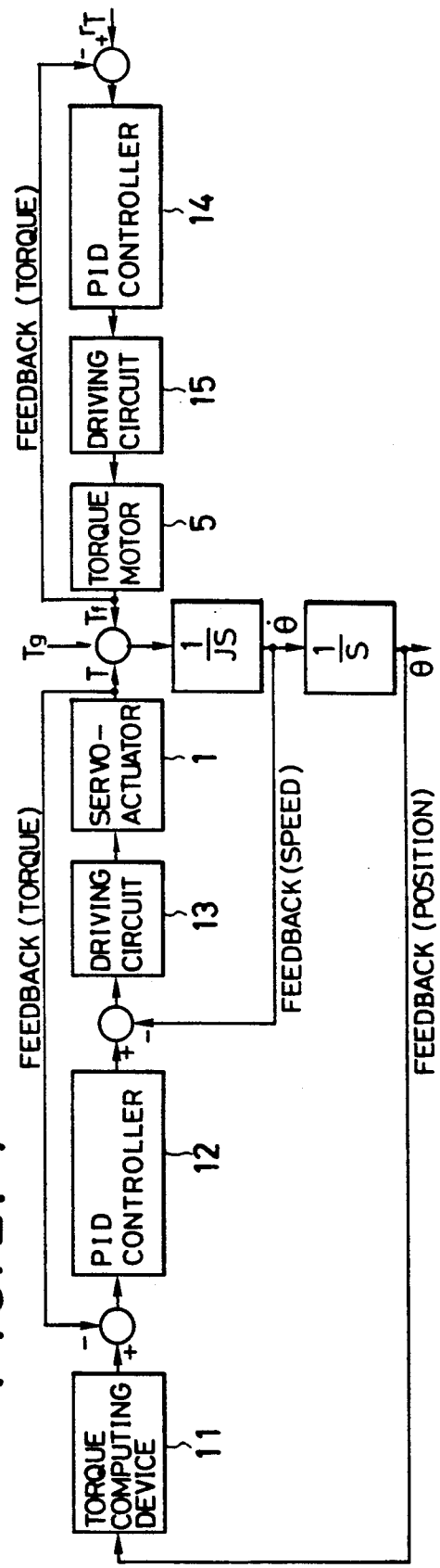

The active gravitation compensation control circuit shown in FIGS. 2(b) and 2(c) is the same as that shown in FIG. 2(a). For control while bringing the arm in the active gravitation compensated state to a position at a certain angle, the torque motor 5 may be driven with an ordinary position control servo system. FIG. 2(b) shows this case. In this case, a voltage proportional to the difference between a desired position (angle) $^r\theta$ of the arm and a position $\theta$ of the arm assumed before movement is fed through the PID controller 14 to the motor driving circuit 15 to generate a drive force for driving the torque motor 5. The position $\theta$ of the arm driven in the above way is detected by the resolver 7 so as to be fed back to the arm weight compensation system and the torque motor position control servo system. The torque motor generates output torque $T_f$, which is zero when the arm is at a desired position, and causes the arm to approach the desired position as the arm is deviated therefrom. A problem in this control system is the servo rigidity when the arm is in the neighborhood of the desired position. However, if the gain of the PID controller 14 is set large enough for the control system as a whole to produce no oscillation, there is obtained an effect of momentary inertia of the arm, and the servo rigidity is sufficiently high. The tracing characteristic of the arm weight compensation system assumed when the arm is quickly moved to the desired position, depends on the response characteristic of the arm weight compensation system. However, it has been confirmed that as a result of experiments using the apparatus shown in FIG. 3 that accurate tracing can be obtained even when the arm is moved quickly.

To apply a certain torque to the arm in the active gravitation compensated state, an ordinary force servo system using the output of the torque sensor 6 as shown in FIG. 2(c) may be used. More specifically, a voltage proportional to the difference between the desired torque 'T and the torque detected by the torque sensor 6 of the torque motor 5 is fed through the PID controller 14 to the motor driving circuit 15 to drive the torque motor 5. The output torque $T_f$ of the torque motor 5 is detected by the torque sensor 6 and fed back, whereby the desired torque is applied to the arm.

Figure 3:
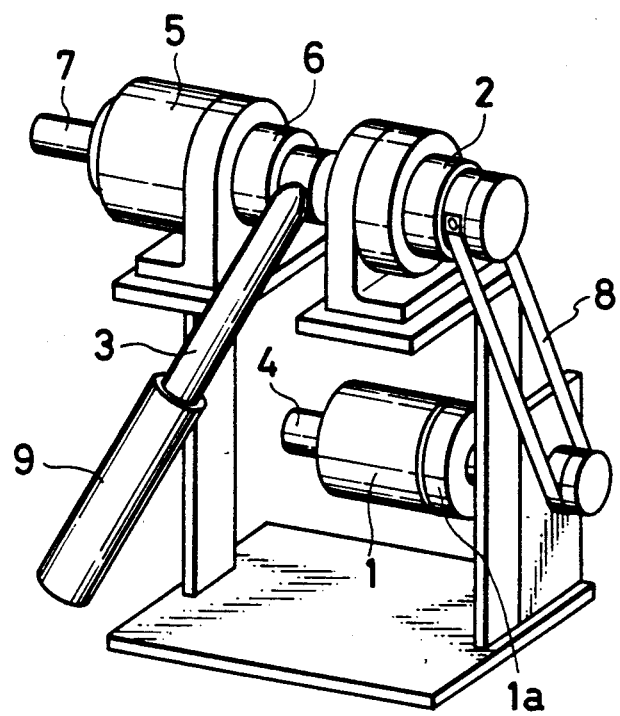
FIG. 3 is a perspective view showing an embodiment of the active gravitation compensation device according to the invention.

Experiments involving arm weight compensation with one degree of freedom were conducted using the active gravitation compensation apparatus as shown in FIG. 3. In this apparatus, the length of the arm 3 from the tip thereof to the stem was 30 cm, and the weight of the arm was about 1 kg. A resolver 7 was connected to one end of the shaft of an arm drive motor 5 to detect the position (i.e. angle) of the arm. The other end of the motor shaft was connected to the arm support shaft via a torque sensor 2.

As a servo actuator 1 for active gravitation compensation, a DC servomotor with a speed reducer 1a (1:10), which provided an output torque of 12.7 kgf.cm, was used. This DC servomotor 1 was provided with a tacho-generator 4, and it was indirectly coupled to the arm support shaft, but its torque was transmitted to the arm after speed reduction to 1:3 via a steel belt 8. The reason for adopting this structure is that in actual manipulators or the like it is often inevitable, due to the space and shape restrictions, to dispose the active gravitation compensation servomotor at a slightly spaced-apart position. Also, the steel belt was used in lieu of gears for power transmission in order to avoid backlash. The torque transmitted to the arm was detected by the torque sensor 2 using a strain gauge.

The experiment was conducted using weights of 1, 2 and 5 kg as a weight 9 attached to the tip of the arm 3. In either case, substantially perfect active gravitation compensation could be attained by the servomotor. Even when the 5-kg weight was used, the arm appeared to be floating in a gravitation-free space. When the arm was lightly pushed either upwards or downwards, it moved smoothly up to a limit without being stopped at an intermediate position.

Figure 4:
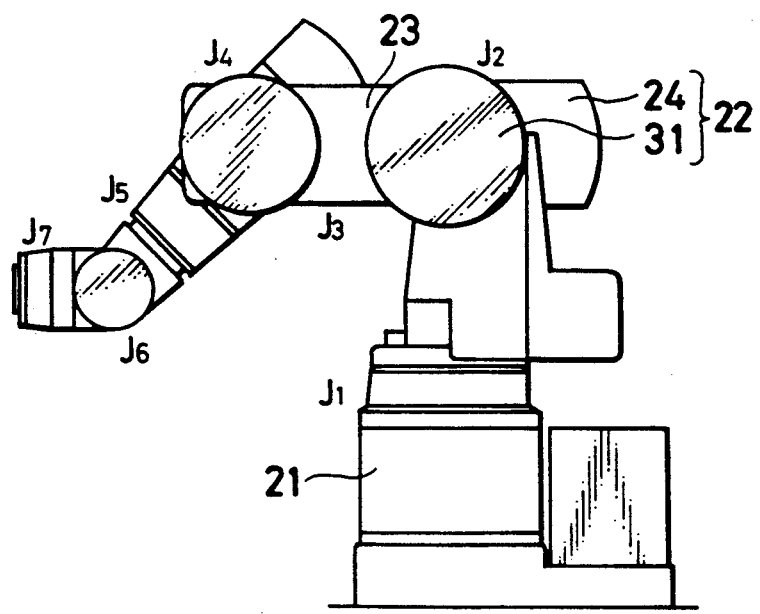
FIG. 4 is a schematic side view showing a manipulator with seven degrees of freedom constructed according to the invention.

FIG. 4 shows a man's arm type manipulator having seven degrees of freedom, which is designed for automatic sewing. It has seven rotatable joints (axes) $J_1$ to $J_7$. A sewing machine (not shown) is mounted on a hand portion of the manipulator.

In this manipulator having seven degrees of freedom, the active gravitation compensation device according to the invention is employed in first and second joints 21 and 22, which support the heaviest weight.

The active gravitation compensation device employed in the second joint 22 will now be described with reference to FIG. 5. An arm member 23 is supported on a shaft member 24 of the second joint 22 rotatable about the axis $J_2$. The arm member 23 is rotatable about the axis $J_3$ and its tip constitutes a bearing supporting the shaft (not shown) of the axis $J_4$. One support shaft 25a of the shaft member 24 is connected to a cylindrical coil portion 27a of a torque motor 27 via a disk-like torque sensor 26. On the outer periphery of the coil portion 27a there is provided a cylindrical magnet portion 27b of torque motor 27 secured to a body 31 of the joint $J_2$. There is a small gap between the coil portion 27a and the magnet portion 27b. The other support shaft 25b of the shaft member 24 is connected to a speed reduction gear train 30 via a disk-like torque sensor 28. A final gear 30a of the gear train 30 is in mesh with a gear (not shown) secured to the shaft of a servomotor 29 provided in a lower portion of the body 31.

The active gravitation compensation for the arm member 23 is effected through the rotation of the support shaft 25b caused by the output of the servomotor 29 transmitted through the speed reduction gear train 30 and torque sensor 28 to the support shaft 25b of the shaft member 24 supporting the arm member 23. The torque provided from the servomotor 29 has a value matching the weight compensated on the basis of the total weight of the sections $J_3$ to $J_7$ coupled to the arm member 23 and a hand (a sewing machine) and the changes in orientation of various parts with the rotation of the joints $J_3$ to $J_7$ This value is detected by the torque sensor 28.

The servomotor 29 provides torque corresponding to the gravitation acting on the arm member 23 to render the arm member 23 to be substantially in a gravitation-free state. Then, a voltage signal for generating a torque for operating the arm 23 is fed to the torque motor 27 so as to directly drive the support shaft 25a. The output of the torque motor 27 is coupled through the torque sensor 26 to the support shaft 25a to cause a rotation thereof by a predetermined angle. It will be understood that although the arm member 23 actually undergoes considerable active gravitation, it is held substantially in a gravitation-free state by the servo-actuator, so that only small torque is required to operate the arm member 23, and accurate control of a predetermined operation of the arm member 23 can be obtained with a small-sized torque motor.

Figure 5:
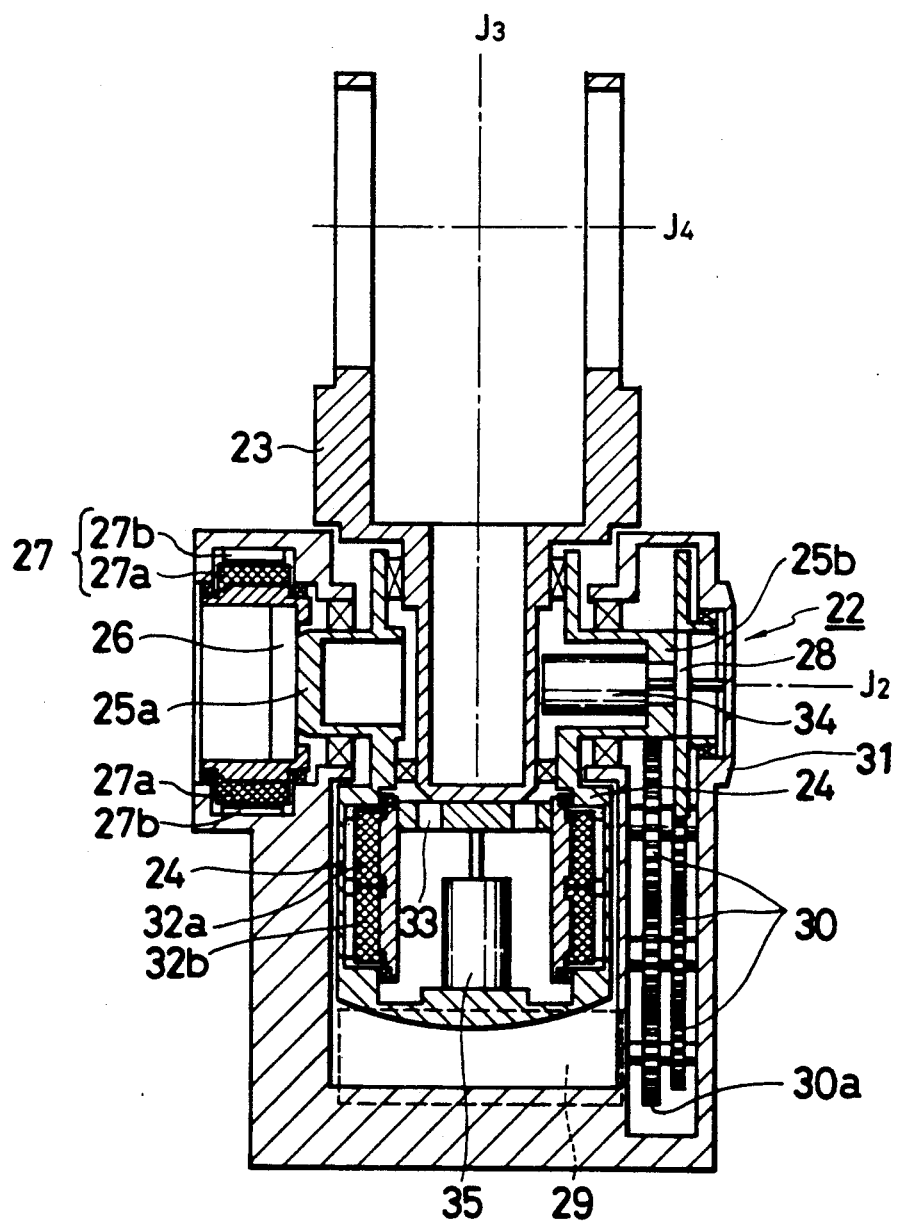
FIG. 5 is an essential enlarged sectional view showing the manipulator shown in FIG. 4.

In FIG. 5, reference numerals 32a and 32b designate two direct drive torque motors for the axis $J_3$, which are connected in parallel fashion to double the torque. The joint $J_3$ has no gravity compensating device because of a lack of space for such a device and because of the need to reduce the weight. Numeral 33 designates a torque sensor for detecting torque externally applied to the arm member 23, and numerals 34 and 35 designate resolvers for detecting the rotational angle of the arm member 23.

Figure 6:
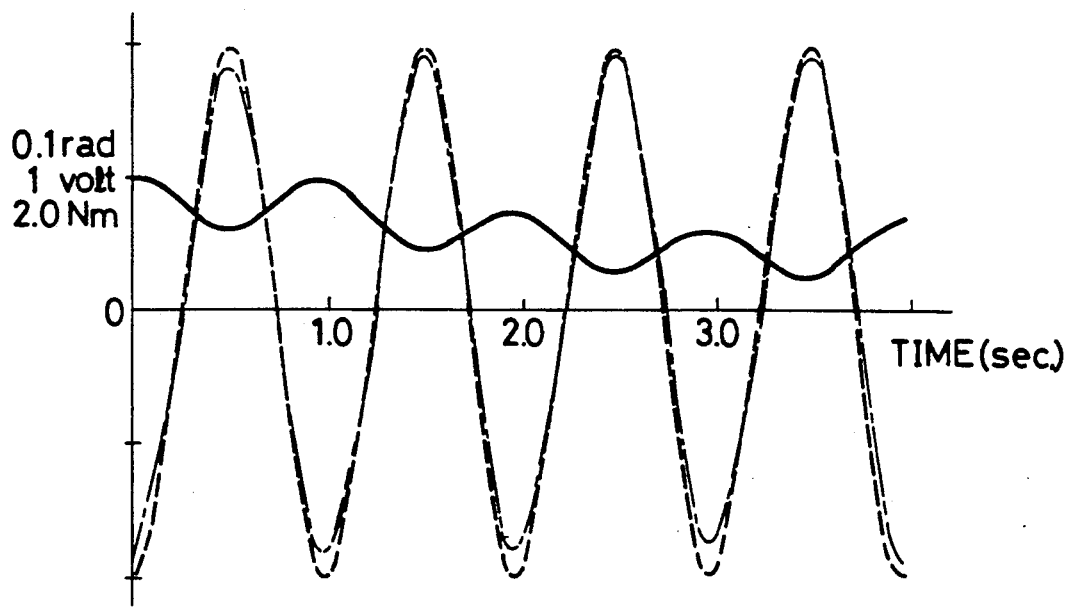
FIG. 6 is a graph showing an example of the results of the measurement of frequency response characteristics obtained according to the present invention.

FIG. 6 shows the frequency characteristics of the support shafts 25a and 25b of the shaft member 24 obtained in a case where the direct drive motor 27 is driven with a sine wave while effecting active gravitation compensation for the arm member 23 supported by the shaft member 24.

In FIG. 6, a dashed curve shows input voltage (V) fed to the torque motor 27, a dot-and-bar curve the torque motor output (Nm) at this time, and a solid curve the actual movement of the arm 23 at this time.

When the sinusoidal voltage is applied to the torque motor 27 without effecting the active gravitation compensation, a great torque is applied in the direction of resisting the gravitation acting on the arm. Therefore, the torque motor output is no longer symmetrical with respect to a reference line, and the phase of movement of the arm is deviated with respect to the phase of the input sinusoidal voltage. In the illustrated case, however, the torque motor output smoothly follows up the input, and the phase of the arm movement also follows up the input. Thus, it will be seen that the movement of the arm is not influenced by the gravitational force acting on the arm; instead the arm is accurately driven according to a specified torque.

As has been described in the foregoing, according to the invention the active gravitation compensation is effected by the servo-actuator while the force control is effected by the torque motor which has excellent precision and is very responsive. Thus, sufficient control can be obtained with an inexpensive and small-sized torque motor, and it is also possible to provide a manipulator, which is inexpensive and has a satisfactory control liability.

While the invention has been described above in conjunction with a robot manipulator, this is by no means limitative, and the invention is applicable to the precise operational control of any object under gravitation.

What is claimed is:

1. An active gravitation compensation device for a force control system, comprising:

an arm-like driven member having one end thereof provided integrally with a shaft;

a servo-actuator connected to one end of said shaft of said driven member for applying torque to said driven member to compensate for gravitation acting on said driven member;

torque detecting means for detecting the torque applied to said servo-actuator;

torque computing means for comparing a signal of the torque detected by said torque detecting means with a signal for driving said servo-actuator, amending the driving signal on the basis of the result of comparison, and transmitting the amended driving signal to said servo-actuator; and a torque motor connected to the other end of said shaft of said arm-like driven member for applying a given torque to said driven member assuming a gravitation-free state owing to said servo-actuator.

2. The active gravitation compensation device according to claim 1, wherein said driven member is a manipulator.

3. The active gravitation compensation device according to claim 1, further comprising a torque sensor for detecting torque of said torque motor, the torque detected by said torque motor to apply a given torque to said driven member.

* * * * *